May 3, 1932. R. D. NYE 1,857,063
MANIPULATOR FOR ROLLING MILLS
Filed Oct. 8, 1930 4 Sheets-Sheet 2
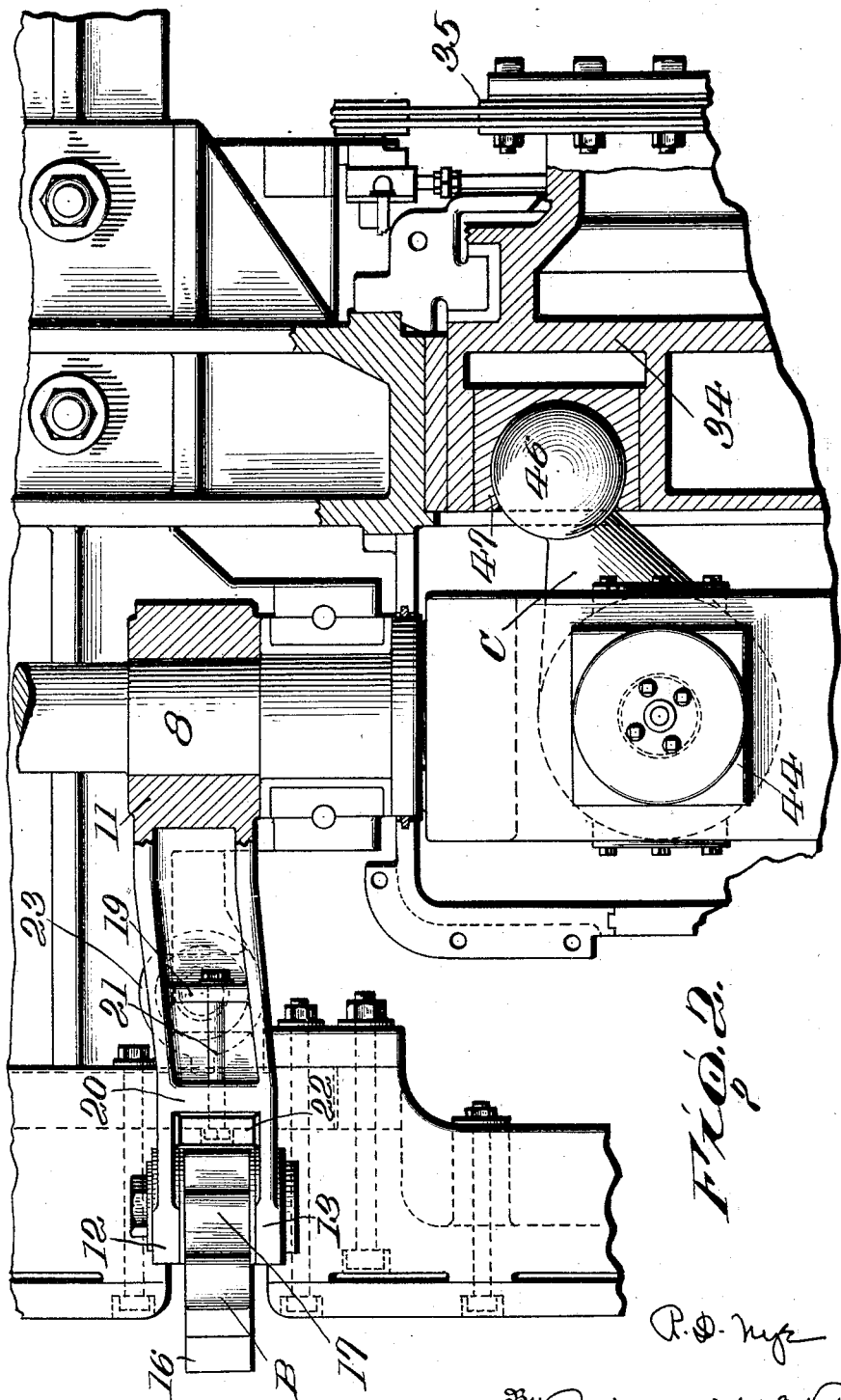

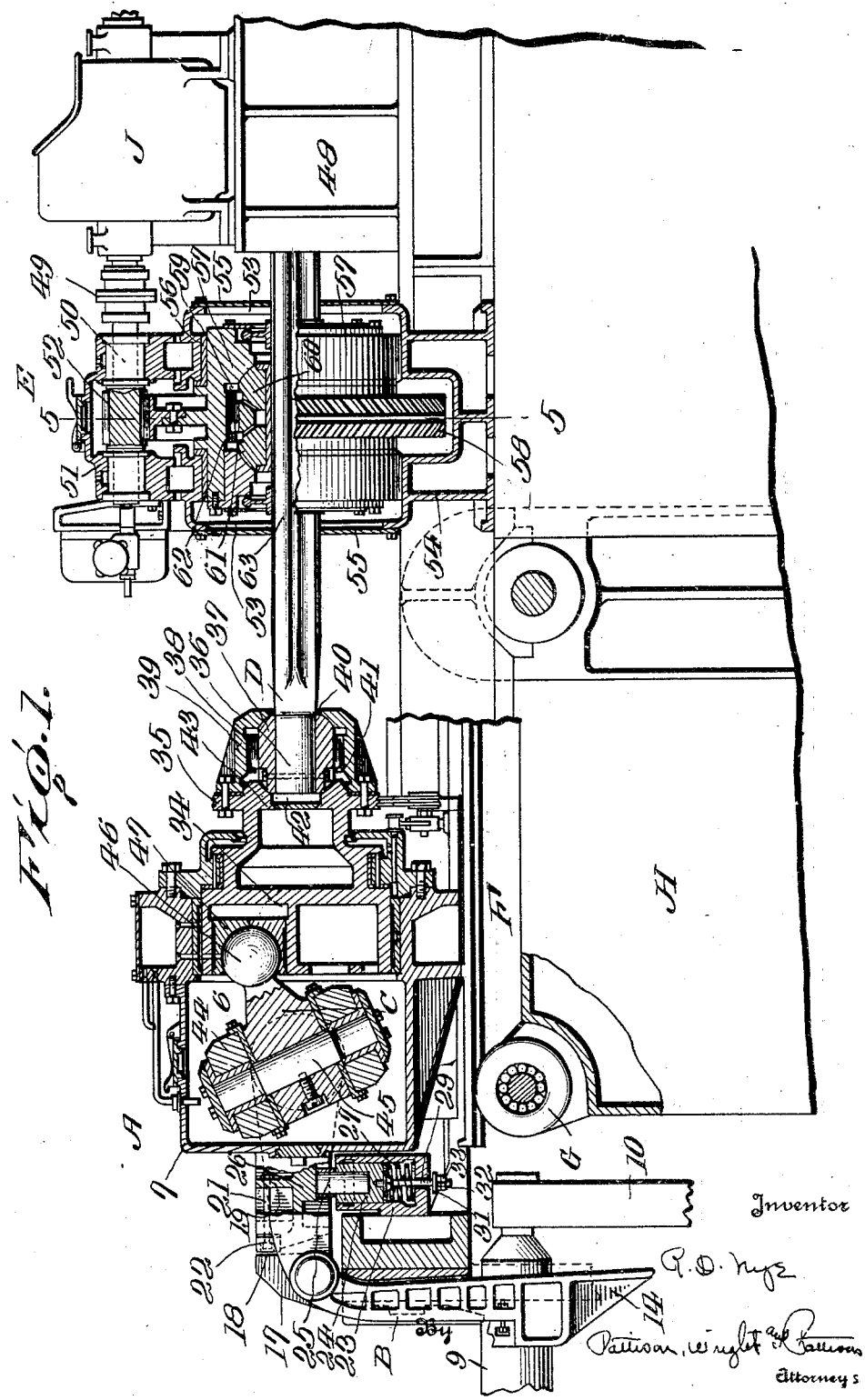

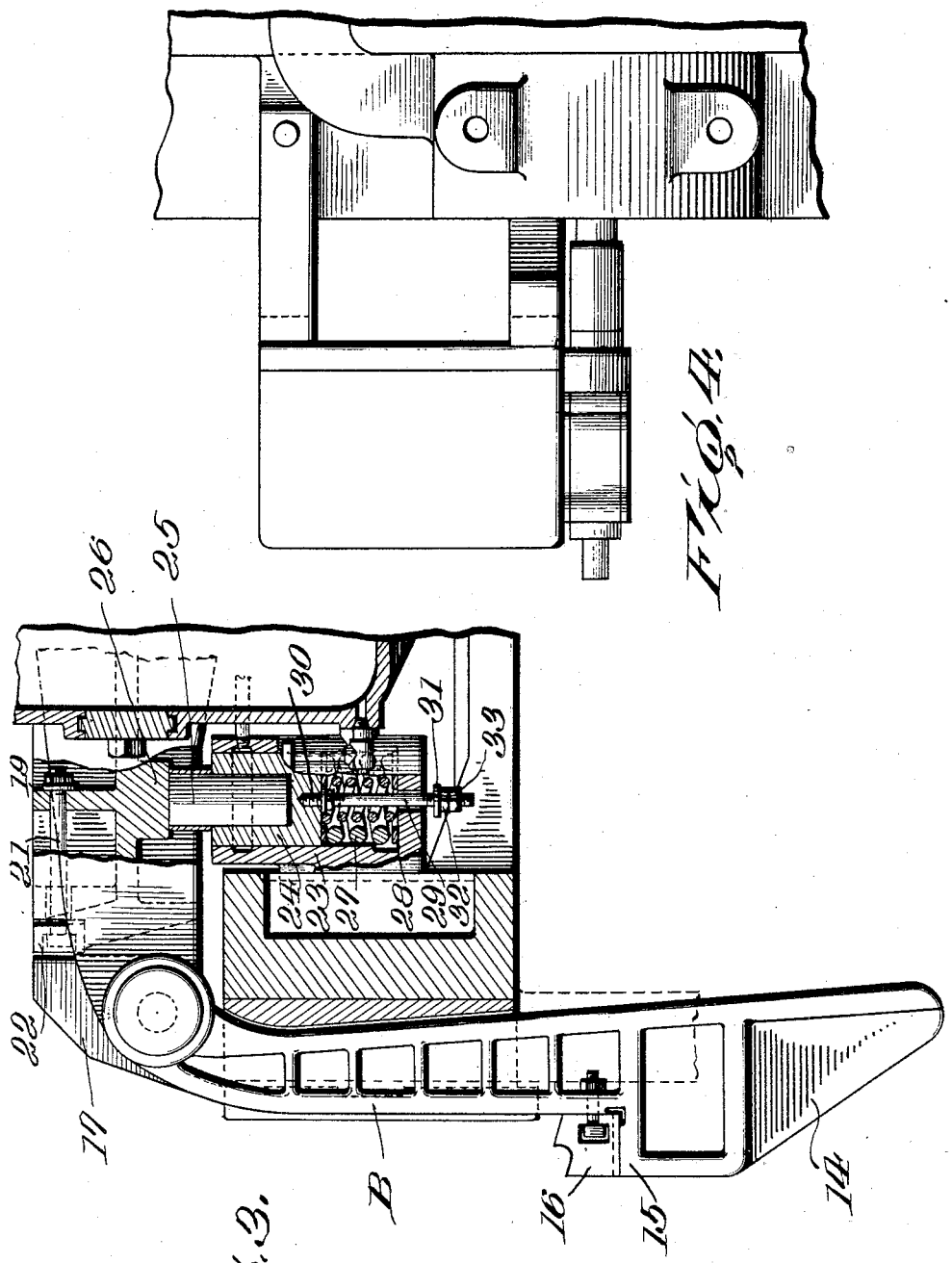

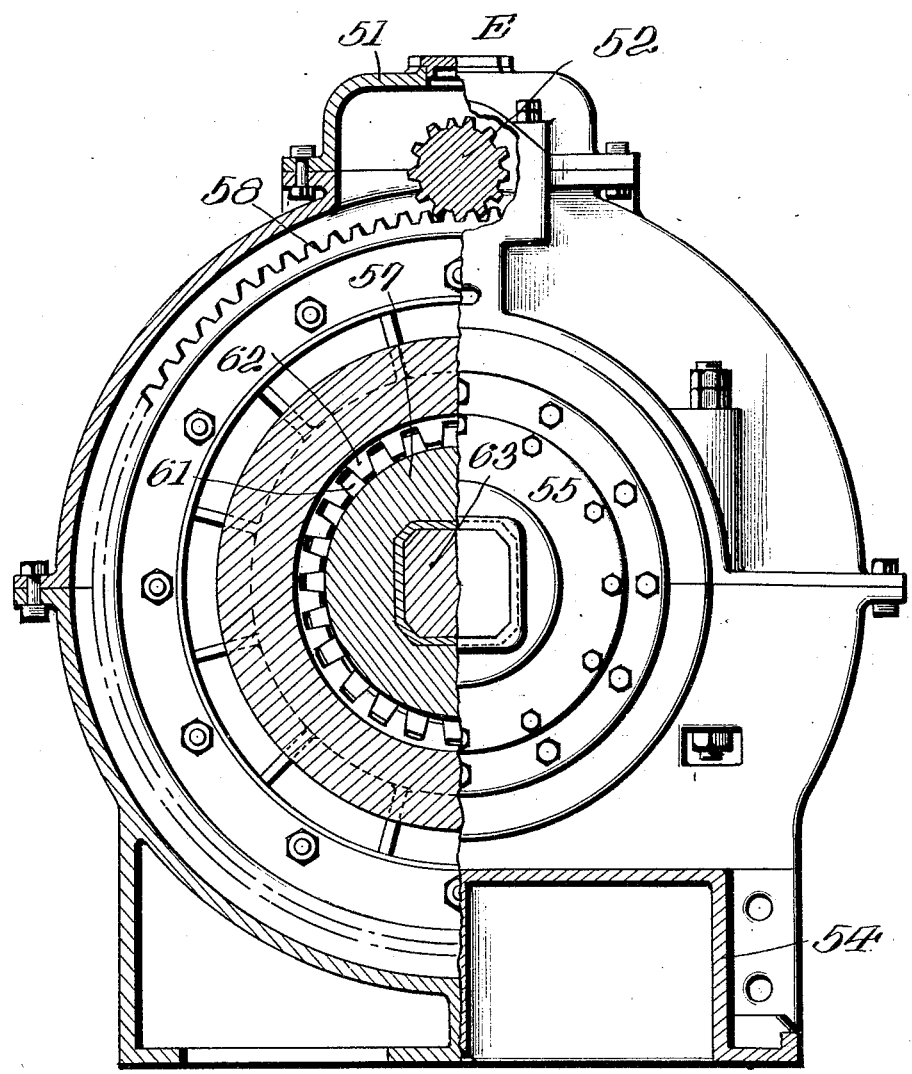

Patented May 3, 1932

1,857,063

UNITED STATES PATENT OFFICE

RALPH D. NYE, OF WHEELING, WEST VIRGINIA, ASSIGNOR TO WHEELING MOLD & FOUNDRY DIVISION OF THE CONTINENTAL ROLL & STEEL FOUNDRY COMPANY, OF WHEELING, WEST VIRGINIA, A CORPORATION OF DELAWARE

MANIPULATOR FOR ROLLING MILLS

Application filed October 8, 1930. Serial No. 487,280.

This invention relates to improvements in manipulators for rolling mills.

An object of the invention is the provision of a retarder and accelerator unit for use with the fingers of the manipulator.

Another object of the invention is the provision of adjustable finger positioning means.

Another object of the invention is the provision of an improved drive for the manipulator fingers.

A still further object of the invention is the provision of a rolling mill manipulator having therein many individual features of novel construction giving to the manipulator an improved operation.

Other specific features of improved and novel construction will appear from the following description taken in conjunction with the accompanying drawings.

In the drawings: Figure 1 is a vertical sectional view through the manipulator and the drive shaft, a portion of the figure being shown in side elevation.

Fig. 2 is an enlarged fragmentary top plan view being broken away and shown in horizontal section.

Fig. 3 is an enlarged view in side elevation of a manipulator finger showing applied thereto the retarder and accelerator unit, a portion of the view being broken away and shown in vertical section.

Fig. 4 is a detail top plan view of the limit switch control.

Fig. 5 is an enlarged view transverse the machine taken on the line 5—5 of Figure 1, a portion of the view being shown in vertical section and a portion in end elevation.

A manipulator for rolling mills comprises broadly a mill table made up of rollers upon which are deposited the ingots that are to be handled or manipulated and lengthwise at one side of the table there is provided a manipulator head carrying a series of fingers for engaging and manipulating the ingot upon the table. To enable a proper manipulation of the ingots transverse the table the manipulator head is reciprocated in a horizontal direction. The manipulator fingers are carried by the manipulator head together with a mechanism which lifts and lowers the fingers while a stationary motive power means is provided for driving the mechanism which operates the manipulator fingers. This construction necessitates a movable yet constantly positive driving connection between the stationary motive power means and the finger operating mechanism which moves with and as a part of the manipulator head.

Having described in broad and general terms a rolling mill manipulator and given a general idea of its mode of operation, reference will now be had to the drawings wherein one form of rolling mill manipulator is illustrated and wherein similar parts are designated by like reference numerals throughout the description.

A general lay-out of a rolling mill manipulator appears in Figure 1 of the drawings wherein the head is designated as an entirety by the reference letter A. This head has as a part of its construction the manipulator fingers B and a universal drive connection or joint C which is driven by the reciprocal drive shaft D. The drive shaft D reciprocates through and has driving connection with the stationary motive power means E. The manipulator head is supported upon a reciprocable carriage F which during its movement is supported upon rollers G mounted in the upper face of the manipulator base H upon which is suitably supported the stationary motive power means as well as the motor J.

Describing the construction in more detail it will be seen that the universal joint or connection C is contained within the chamber 6 of a suitable housing 7 into which extends an end of a shaft 8 which extends lengthwise of the table and in separated relation with the rollers 9 of the table. Incidentally the rollers 9 of the table are driven by a belt connection 10 with some suitable source of motive power, not shown.

The shaft 8 runs lengthwise of the table but transverse the manipulator in a position horizontally above the reciprocable carriage F and carries a plurality of finger supporting arms 11, which arms at their outer end are forked and support loosely between their ends 12 and 13 the manipulator fingers B.

The stationary motive power means rocks the shaft 8, as will be hereinafter described, and hence lifts and lowers the finger supporting arms 11 and consequently lifts and lowers the manipulator fingers B.

These manipulator fingers hang in a vertical position upon their pivotal support in the ends of the rocker arms and their lower ends 14 are positioned in the spaces between the table rollers 9 and below the same. In their front faces at a point slightly below the tops of the table rollers 9 these fingers are provided with shoulders 15 upon which are removably fastened contact elements 16 which actually engage and manipulate the ingots when the fingers are lifted. At their extreme outer ends the fingers are provided with a vertical extension 17 which extensions have a vertical wall 18 extending above the finger supporting rocker arms 11.

The upper face of each of these rocker arms at a point behind its forked end is provided with a vertical web 19 in separated relation with a second vertical web 20. An elongated bolt 21 passes through these webs and positioned between the web 20 and the vertical wall 18 of the finger extending end 17 is an adjusting block 22. This block 22 is held in place by the bolt 21, the head of the bolt being counter-sunk therein.

Inasmuch as the manipulator fingers B swing freely upon their pivotal support in the ends of the rocker arm 11 it will be evident that the fingers, when lowered, can be positioned by these blocks 22. If the blocks 22 are made to engage the finger extension 17 and force the same outwardly the lower ends 14 of the manipulator fingers will be swung inwardly towards the manipulator. The exact positioning of the lower ends of the fingers can thus be had by putting shims between the blocks 22 and the webs 20 of the rocker arms. Hence these blocks 22 constitute finger positioning means.

Immediately below each finger supporting arm 11 there is provided a cylinder 23 in which is reciprocably mounted a piston 24 carrying what might be termed a tappet 25, the upper end of which when the fingers are in their lowered position is engaged by a downwardly projecting lug 26 formed on the under side of the rocker arms.

Downward movement of the piston in the cylinder is against the tension of a coil spring 27 and the coil spring 28 which is of a lesser size and positioned within the larger coil 27. Escapement of the piston from the upper end of the cylinder is prevented by the rod 29 the inner end of which is threadedly attached as at 30 to the piston rod while its other end is positioned exteriorly of the cylinder bottom and carries a washer or enlarged head 31. The position of the washer or head 31 upon the rod is adjustable through the medium of the nuts 32 and 33.

This piston and cylinder constitutes a finger accelerator and retarder which might well be called a dash pot. As the fingers are lowered by the rocker arms 11 the lugs 26 of the arms engage the piston tappet and the fingers assume their lowermost position against the tension of the coil springs 27 and 28 which thus form a retarder. In assuming their lower-most position these fingers store up energy in the coil springs 27 and 28 with the result that when the fingers are lifted the energy in these springs act as an accelerator for the upward movement of the fingers. The rocker arms will of course carry the fingers down in each instance to a pre-determined position which position can to some extent be adjusted by the adjusting blocks, which blocks will also hold the fingers, when down, in said predetermined adjusted positions.

The rear end of the housing 7 is open and rotatably mounted therein is a wheel or disc 34 having an end 35 extending through the open rear end of the housing. This portion 35 might be termed a shaft portion inasmuch as it has connection with the drive shaft D.

The drive shaft D has a rounded end portion 36 to which is bolted a spherical member 37 having on its outer face teeth 38. Bolted to the shaft portion 35 of the wheel or disc is a cap 39 having in its end an opening 40 through which the drive shaft D passes. In its inner face this cap is provided with teeth 41 which mesh with the teeth 38 of the shaft's spherical member 37 and thus a driving connection is made between the shaft D and the disc.

The spherical member 37 can rock in the cap 38, thus a self aligning connection is insured between the shaft D and the disc. End thrust of the shaft D is taken up through the engagement of the spherical member 37 with the cap 39 and engagement of the enlarged tapered head 42 with the tapered portion 43 of the disc hub 35.

Within the space 6 of the housing is a member 44 having driving connection with the end of the shaft 8. This member 44 is open and carries transverse its opening a shaft 45. Upon the shaft 45 is mounted the universal joint or connector C. This member is free to rotate upon the shaft 45 and has an extending end provided with a ball 46 which ball is free to move within a suitable bearing 47 mounted eccentrically in the face of the wheel or disc 34.

From the parts thus described it will be seen that when the disc or wheel 34 is rotated the member C which is in reality a pitman, will impart to the shaft 8 through the member 44 an oscillating or rocking movement which is the movement desired and necessary to cause this shaft to lift and lower the manipulator fingers through the finger arms 11.

It is intended that these drive parts be well lubricated and means to accomplish this lubrication are illustrated in the drawings but as the lubrication forms no part of the present invention no more than general mention will be made of the same.

The drive motor J is supported upon a suitable base 48 at the rear of the manipulator and is coupled as at 49 to a shaft 50 which is rotatably mounted and supported within a suitable housing 51. Within the housing this shaft 50 carries a herring-bone gear 52. The housing 51 is provided with a circular opening 53 and the base 54 of the housing rests upon and is attached to the manipulator base H. The housing openings 53 are closed by suitable plates 55, which plates allow the passage of the drive shaft D.

Rotatably supported upon bearings 56 within the lower portion of the housing 51 is a drum 57 having on its exterior face a herring-bone ring gear 58 the teeth of which mesh with the herring-bone gear 52 of the motor shaft extension 50 and is consequently rotated thereby.

Within the drum 57 is a spherical shaped opening or chamber 59 within which is mounted a spherical self aligning toothed coupling 60 provided with teeth 61 having an outer curved edge which mesh with the teeth 62 which extend inwardly from the inner face of the spherical opening 59 of the drum.

Centrally the spherical shaped toothed coupling 60 is provided with a squared opening through which extends the squared portion 63 of the drive shaft D, which shaft is elongated to extend to a point considerably in the rear of the rotary drum and the spherical toothed coupling while, as has already been described, it extends forwardly sufficiently far for driving connection with the cap 39 of the hub portion 35 of the circular wheel or disc 34.

Attention is directed to the fact that the connection between the drive shaft D and the wheel or disc 34 is also a spherical self aligning toothed connection or coupling.

The drive mechanism for the rock shaft which actuates the manipulator fingers has now been described and it will be seen that the rotary motion of the drive shaft D is converted into an oscillating motion in the finger rock shaft 8. As the manipulator head and fingers are reciprocated transverse the rollers 9 of the table the drive shaft D will slide through the squared opening in the self aligning toothed coupling 60 and will at all times maintain a drive connection between the shaft D and the rotary driven drum 57.

This sliding connection makes it possible to drive from a stationary motive power means the manipulator fingers at any position they can be made to assume on the mill table and that for each revolution of the driven rotary rock shaft the rock shaft will lift the manipulator fingers up and down.

The self aligning toothed couplings used for connecting the drive shaft D to the rotary plate or wheel 34 and to the rotary drum 57 form supports for the drive shaft and provide a uniform bearing support for the shaft at any position and at the same time takes care of the self alignment of the shaft with the result that wear, breakage, and upkeep are materially reduced.

Conversion of a rotary motive power to oscillate a shaft as has been described constitutes a vast improvement over the manipulators as commonly constructed in that it does away with a great many gears, links and levers which in manipulators have heretofore been used for the reason that what constitutes the rock shaft of the present invention has in manipulators heretofore been a rotary shaft thus necessitating links and levers to impart a lifting and lowering movement to the manipulator fingers.

The present invention also includes a worm driven limit switch which is driven by the motor extension shaft 50. The arrangement is such that the limit switch shaft will rotate 180 degrees while the squared drive shaft D rotates 360 degrees which makes it practical to control accurately the position of the manipulator fingers when they are in their lowered positions. This limit switch is of a cam operated type and due to the fact that the limit switch shaft rotates only one-half as fast as the driving shaft a slight adjustment of the cams of the switch shaft will control accurately the stopping position of the drive shaft D when the manipulator fingers are in their lowered positions.

Having thus described my invention what I claim and desire to secure by Letters Patent is:

1. In a rolling mill manipulator, manipulator fingers, a driven shaft, arms connecting the fingers to the shaft, and means operatable by said arms for retarding and accelerating the movement of the fingers.

2. In a rolling mill manipulator, manipulator fingers, a driven rock shaft, rock arms connecting the fingers to said rock shaft, dash pots positioned below each finger supporting rock arm, said dash pots retarding the downward movement of the fingers and accelerating the upward movement of the fingers.

3. A rolling mill manipulator comprising a rock shaft, a plurality of rock arms supported and actuated thereby, manipulator fingers supported and actuated by said rock arms, dash pots positioned beneath each of said rock arms, said dash pots comprising a cylinder having therein reciprocable pistons, springs positioned beneath said pistons, said rock arms adapted to engage said pistons when lowering the manipulator fingers and to depress the pistons against spring tension normally holding them upward, and said pistons by reason of the stored energy in said springs accelerating the movement of the rock arms and the manipulator fingers when the same are raised.

4. In a rolling mill manipulator having manipulator fingers, a driven rock shaft, a plurality of rock arms attached to said shaft, said rock arms loosely pivotally supporting the manipulator fingers, said rock arms carrying adjustable blocks adapted to engage said fingers and move them upon their pivotal support to position the fingers when in their lowered positions.

5. A rolling mill manipulator comprising a driven rock shaft having attached thereto a plurality of rock arms having bifurcated outer ends, manipulator fingers pivotally supported in the bifurcated ends of the rock arms and free to swing therein, adjustable blocks movably supported in the bifurcated ends of the rock arms and adapted for engagement with the manipulator fingers, and means to move said blocks into and out of engagement with the manipulator fingers for positioning the same when in their lowered positions.

6. A rolling mill manipulator comprising a driven rock shaft, a plurality of rock arms carried by said shaft and pivotally supporting manipulator fingers, said fingers free to swing upon their pivotal support and adapted to be raised and lowered by the rock arms and said rock shaft, means carried by said rock arms for positioning the fingers when in their lowered positions, and means independent of the drive means of the fingers for retarding the movement of the rock arms as the same assume positions to lower the fingers, and said retarding means accelerating the movement of the rock arms and the fingers when the rock arms are lifted to raise the fingers.

7. A construction such as that defined in claim 6, wherein the mechanism defined is supported upon a carriage reciprocable in a horizontal plane to permit the movement of the fingers transverse a manipulator mill table.

8. A rolling mill manipulator comprising a stationary motor, a reciprocable manipulator head comprising a rock shaft having a plurality of rock arms pivotally supporting manipulator fingers, said rock arms adapted to raise and lower said fingers, means carried by said rock arms for positioning the fingers when in their lowered positions, means positioned beneath said rock arms for retarding the movement of the same in a downwardly direction and accelerating the movement of the same in an upwardly direction, a driving connection between the rock shaft and the stationary motor, said driving connection converting the rotary motive power of the stationary motor into a rocking motion to said rock shaft, and said drive connection between the rock shaft and the stationary motor permitting movement of the rock shaft towards and away from the motor but constantly maintaining driving connection with the rock shaft and the motor.

9. In a rolling mill manipulator, manipulator fingers, a drive therefor, and a retarding device operable upon the movement of the fingers and retarding the downward movement thereof.

10. In a rolling mill manipulator, manipulator fingers, a drive therefor, and a combined retarding and accelerating device acting on the fingers and slowing the downward movement and accelerating the upward movement thereof.

11. In a rolling mill manipulator, manipulator fingers, a drive therefor, a combined finger retarding and accelerating device, and said device operated by and acting on the finger drive.

12. In a rolling mill manipulator, manipulator fingers, a drive therefor, and a resilient retarding device operatable on the fingers and controlling the downward movement thereof.

13. In a rolling mill manipulator, manipulator fingers, a drive therefor, and a resilient combined retarding and accelerating device operated upon the movement of the fingers and controlling the movement thereof.

14. In a rolling mill manipulator, pivotally mounted driven manipulator fingers, for lifting and lowering the same, a drive, and movable means engaging said fingers for adjusting the positions of the fingers when in their lowered positions.

15. In a rolling mill manipulator, pivotally mounted manipulator fingers, a drive for lifting and lowering the same, and movable means for engaging said fingers above their pivotal support to adjust the position of the fingers when in their lowered positions.

16. In a rolling mill manipulator, movable fingers, a drive therefor, finger supporting elements, and movable means carried by said supporting elements for adjusting the position of the fingers when in their lowered positions.

17. In a rolling mill manipulator, manipulator fingers, a drive mechanism supporting the finger arms connecting the fingers to the mechanism, and means positioned beneath said arms and operable thereby for retarding and accelerating the movement of the fingers.

18. In a rolling mill manipulator, manipulator fingers, a driven shaft, arms connecting the fingers to said shaft, resilient means positioned below each finger supporting arm, and said resilient means retarding the downward movement of the arms and fingers and accelerating their upward movement.

19. A rolling mill manipulator comprising a shaft, a plurality of arms supported and actuated thereby, manipulator fingers supported and actuated by said arms, dash pots positioned beneath said arms, and said dash pots comprising a cylinder having therein a piston movable against and compressing a resilient element, said dash pots being actuated by said arms for retarding and accelerating the movement of said fingers on their downward and upward movements respectively.

20. A rolling mill manipulator comprising manipulator fingers, a drive mechanism including a plurality of finger supporting elements having bifurcated outer ends, said manipulator fingers pivotally supported in the bifurcated ends of said supporting elements and free to swing therein, adjustable means positioned in the bifurcated ends of said elements and adapted for engagement with the manipulator fingers, and means to move said adjustable means towards and away from said manipulator fingers for positioning the same when in their lowered positions.

In testimony whereof I hereunto affix my signature.

RALPH D. NYE.